(12) United States Patent
Sato (10) Patent No.: US 7,365,059 B2
(45) Date of Patent: Apr. 29, 2008

(54) PHOTOCROSSLINKED-POLYSACCHARIDE COMPOSITION AND PRODUCTION PROCESS OF THE SAME

(75) Inventor: Tomoya Sato, Higashiyamato (JP)

(73) Assignee: Seikagaku Corporation, Tokyo (JP)

( * ) Notice: Subject to any disclaimer, the term of this patent is extended or adjusted under 35 U.S.C. 154(b) by 0 days.

(21) Appl. No.: 10/548,533

(22) PCT Filed: Mar. 11, 2004

(86) PCT No.: PCT/JP2004/003204

§ 371 (c)(1),
(2), (4) Date: Feb. 28, 2006

(87) PCT Pub. No.: WO2004/081054

PCT Pub. Date: Sep. 23, 2004

(65) Prior Publication Data

US 2006/0252925 A1    Nov. 9, 2006

(30) Foreign Application Priority Data

Mar. 11, 2003    (JP)    ............... 2003-065704

(51) Int. Cl.
*A61K 31/70*    (2006.01)
(52) U.S. Cl. ..................................... 514/54
(58) Field of Classification Search ............... 522/88; 536/55.1, 55.2, 55.3, 56
See application file for complete search history.

(56) References Cited

U.S. PATENT DOCUMENTS 5,137,733 A * 8/1992 Noda et al. ............... 424/497
5,462,976 A * 10/1995 Matsuda et al. ............ 522/74
6,031,017 A * 2/2000 Waki et al. ................ 522/84

FOREIGN PATENT DOCUMENTS

| JP | 6-73102 A | 3/1994 |
| JP | 11-512778 A | 11/1999 |
| WO | WO 02/060971 A1 | 8/2002 |

OTHER PUBLICATIONS

Malene Jensen et al., "Loading into and electro-stimulated release of peptides and proteins from chondroitin 4-sulphate hydrogels" (2002), European Journal of Pharmaceutical Sciences, vol. 15, pp. 139-148.
International Search Report dated Jun. 22, 2004.
Leach et al., "Photocrosslinked Hyaluronic Acid Hydrogels: Natural, Biodegradable Tissue Engineering Scaffolds", Biotechnology and Bioengineering, Wiley & Sons, Hoboken, NJ, US, vol. 82, No. 5, Jun. 5, 2003, pp. 578-589.

* cited by examiner

*Primary Examiner*—Elli Peselev
(74) *Attorney, Agent, or Firm*—Sughrue Mion, PLLC (57) ABSTRACT

A process for producing a photocrosslinked-polysaccharide composition, which comprises: freezing a photoreactive polysaccharide-containing solution comprising a photoreactive polysaccharide in which a photoreactive group is bound to a polysaccharide, an aqueous solvent capable of dissolving the photoreactive polysaccharide, and any one substance selected from the group consisting of alcohol having compatibility with the aqueous solvent, a surfactant and a chelating agent; and irradiating the resulting frozen product with light, and a photocrosslinked-polysaccharide composition obtained by the process.

11 Claims, 3 Drawing Sheets

PHOTOCROSSLINKED-POLYSACCHARIDE COMPOSITION AND PRODUCTION PROCESS OF THE SAME

TECHNICAL FIELD

The present invention relates to a photocrosslinked-polysaccharide composition in which a photoreactive polysaccharide to which a photoreactive group is bound is crosslinked, and a production process of the same.

BACKGROUND ART

As an example of the technique for obtaining a crosslinked polysaccharide gel, *Eur. J. Pharm. Sci.*, 2002 March; 15(2): 139-48 describes an example in which chondroitin sulfate (hereinafter also referred to as "CS") is crosslinked using diglycidyl ether as the crosslinking agent to form the gel. However, when such a crosslinking agent is used, crosslinking reaction occurs simultaneously with the reaction of chondroitin sulfate with the crosslinking agent, thus causing a problem of having difficulty in removing the unreacted crosslinking agent from the gel.

Accordingly, a technique has been developed for photo-crosslinking a photoreactive polysaccharide from which the crosslinking agent can be easily removed. For example, a technique is known in which a photoreactive glycosaminoglycan is obtained by binding a photoreactive crosslinking group in advance to glycosaminoglycan, the unreacted crosslinking agent is removed by purifying the photoreactive glycosaminoglycan, and then crosslinked-glycosaminoglycan is obtained by irradiating light (JP-A-6-73102). This literature describes a technique in which photoreactive chondroitin sulfate is obtained by binding a photoreactive crosslinking group to chondroitin sulfate, and the photoreactive chondroitin sulfate is dissolved in phosphate buffered saline and then crosslinked by irradiating ultraviolet ray under the state of solution using a mercury lamp to form the gel. However, when a gel of the crosslinked glycosaminoglycan is obtained by such a method, since crosslinking efficiency is poor by the crosslinking reaction under the state of the solution, it is necessary to irradiate light by preparing an aqueous solution containing a photoreactive glycosaminoglycan at a high concentration (10% or more), so that it cannot always be said that this is a method having good efficiency.

On the other hand, as a technique for efficiently crosslinking a photoreactive polysaccharide, for example, a technique is known in which photoreactive glycosaminoglycan prepared by binding a photoreactive crosslinking group to glycosaminoglycan is dissolved in an aqueous solvent, the resulting solution is frozen, and its crosslinking is carried out by irradiating light while keeping the frozen state (WO02/060971). By this method, a crosslinked glycosaminoglycan showing a spongy (porous) property having markedly superior water taking/discharging property is specifically obtained, and a crosslinked glycosaminoglycan showing a gel property is not obtained.

DISCLOSURE OF THE INVENTION

Concern has been directed toward a process for producing a photocrosslinked-polysaccharide, by which a photoreactive polysaccharide prepared by binding a photoreactive group thereto can be crosslinked efficiently and easily, and gel property can be obtained.

In order to solve the above-described problems, the present inventors have conducted intensive studies and found as a result that a product having gel property can be easily obtained when a solution prepared by dissolving a photoreactive polysaccharide and either one of an alcohol, a surfactant or a chelating agent having compatibility with an aqueous solvent in the aqueous solvent is frozen, light is irradiated to the, thus obtained frozen product, and then the irradiated product is melted, if necessary, and that a photoreactive polysaccharide is crosslinked easily and markedly efficiently by the process, and the present invention has been accomplished based on this knowledge.

That is, the present invention relates to the following (1) to (18).

(1) A process for producing a photocrosslinked-polysaccharide composition, which comprises:
freezing a photoreactive polysaccharide-containing solution comprising a photoreactive polysaccharide in which a photoreactive group is bound to a polysaccharide, an aqueous solvent capable of dissolving the photoreactive polysaccharide, and any one substance selected from the group consisting of an alcohol, a surfactant and a chelating agent having compatibility with the aqueous solvent; and
irradiating the resulting frozen product with light.

(2) The process according to (1), wherein the alcohol has such a property that it keeps a frozen state at −7° C. or less when the alcohol is added to an aqueous solvent solution of the photoreactive polysaccharide and is frozen to obtain the frozen product and then the temperature is increased.

(3) The process according to (1) or (2), wherein the alcohol is represented by the following formula (I):

$$R\text{—}OH \qquad (I)$$

wherein R in the formula is selected from the group consisting of
straight chain alkyl having from 1 to 10 carbon atoms,
branched chain alkyl having from 3 to 10 carbon atoms,
—CH$_2$—(CHOH)$_1$—CH$_2$OH (1 in the formula is an integer of from 0 to 5), (m in the formula is an integer of from 3 to 5), and
—(CH$_2$CH$_2$O)$_n$—H (n in the formula is an integer of from 3 to 70).

(4) The process according to (1), wherein the surfactant is a nonionic surfactant or an anionic surfactant.

(5) The process according to (4), wherein the nonionic surfactant is poly(ethylene glycol), and the anionic surfactant is alkyl sulfate.

(6) The process according to (1), wherein the chelating agent is selected from the group consisting of hydroxycarboxylic acid and polyaminocarboxylic acid.

(7) The process according to (6), wherein the hydroxycarboxylic acid is citric acid, and the polyaminocarboxylic acid is ethylenediaminetetraacetic acid.

(8) The method according to any one of (1) to (7), wherein the polysaccharide constituting the photoreactive polysaccharide is selected from the group consisting of heteroglycan, homoglycan and derivatives thereof (9) The process according to (8), wherein the heteroglycan is glycosaminoglycan selected from the group consisting of hyaluronic acid, chondroitin, chondroitin sulfate, dermatan sulfate, heparin, heparan sulfate and keratan sulfate, and the homoglycan is acidic homoglycan selected from the group consisting of alginic acid and carboxymethylcellulose.

(10) The process according to (8), wherein the glycosaminoglycan derivative is a desulfation and/or oxidation reduction derivative.

(11) The process according to (10), wherein the desulfation derivative is 6-O-desulfated heparin in which a sulfate group bound to the 6-position hydroxyl group of the N-acetylglucosamine residue of heparin is removed.

(12) The process according to any one of (1) to (11), wherein the polysaccharide has a weight average molecular weight of from 1,500 to 500,000.

(13) The process according to any one of (1) to (12), wherein the photoreactive group in the photoreactive polysaccharide binds to a carboxyl group of the polysaccharide.

(14) The process according to any one of (1) to (13), wherein the photoreactive polysaccharide-containing solution is a solution containing from 0.5 to 10% of the photoreactive polysaccharide.

(15) The process according to (14), wherein the photoreactive polysaccharide is glycosaminoglycan having a molecular weight of from 1,500 to 100,000.

(16) A photocrosslinked-photocrosslinked-polysaccharide composition which is obtained by freezing a photoreactive polysaccharide-containing solution comprising a photoreactive polysaccharide in which a photoreactive group is bound to a polysaccharide, an aqueous solvent capable of dissolving the photoreactive polysaccharide and any one substance selected from the group consisting of an alcohol, a surfactant and a chelating agent having compatibility with the aqueous solvent; irradiating the resulting frozen product with light; and melting the frozen product.

(17) The photocrosslinked-polysaccharide composition according to (16), which has a viscosity of from 300 to 30,000 mPa·S when measured by a rotational viscometer under conditions of standard cone (1 degree) and 20° C., and is gel state.

(18) A kit for injection of photocrosslinked-polysaccharide composition, which comprises the photocrosslinked-polysaccharide composition according to (17) which is filled in an injector capable of pushing out the composition.

BEST MODE FOR CARRYING OUT THE INVENTION

The present invention is described below in detail based on the embodiments of the present invention.

The present invention relates to a process for producing a photocrosslinked-polysaccharide composition, which comprises: freezing a photoreactive polysaccharide-containing solution comprising a photoreactive polysaccharide in which a photoreactive group is bound to a polysaccharide, an aqueous solvent capable of dissolving the photoreactive polysaccharide, and any one substance selected from the group consisting of an alcohol, a surfactant and a chelating agent having compatibility with the aqueous solvent; and irradiating the resulting frozen product with light (hereinafter also referred to "production process of the present invention").

The present invention further relates to a photo-crosslinked-polysaccharide composition which is obtained by freezing a photoreactive polysaccharide-containing solution comprising a photoreactive polysaccharide to which a photoreactive group is bound, an aqueous solvent capable of dissolving the photoreactive polysaccharide and any one substance selected from the group consisting of an alcohol, a surfactant and a chelating agent having compatibility with the aqueous solvent; irradiating the resulting frozen product with light; and melting the frozen product (hereinafter also referred to as "composition of the present invention").

The polysaccharide which constitutes the photoreactive polysaccharide to be used in the production process of the present invention includes heteroglycan, homoglycan and derivatives thereof Also, the polysaccharide which constitutes the photoreactive polysaccharide is the same as the polysaccharide which constitutes the photocrosslinked-polysaccharide in the composition of the present invention.

The heteroglycan is a polysaccharide comprising two or more different monosaccharides as the constituting saccharides, and according to the present invention, and glycosaminoglycan or derivatives thereof are particularly preferable. The glycosaminoglycan (hereinafter also referred to as "GAG") is a polysaccharide comprising a basal structure containing an amino sugar and uronic acid (or galactose). Examples include hyaluronic acid, chondroitin, chondroitin sulfate, dermatan sulfate, keratan sulfate, heparin and heparan sulfate; preferred examples include chondroitin, chondroitin sulfate, dermatan sulfate and heparin; and more preferred examples include chondroitin sulfate, dermatan sulfate and heparin.

Examples of the derivatives of the glycosaminoglycans include sulfation derivatives in which a sulfate group is bound to GAG, desulfation derivatives in which sulfate group is partially or completely removed from GAG, oxidation reduction derivatives in which GAG is subjected to oxidation reduction reaction, oxidation reduction-desulfation derivatives in which GAG is subjected to oxidation reduction reaction and desulfation reaction, and the like. The sulfation derivatives include sulfated hyaluronic acid, chondroitin polysulfate and the like. The desulfaction derivatives include 6-position desulfated heparin (WO00/06608), 2-position desulfated heparin (JP-A-2003-113090), completely desulfated heparin and the like. The oxidation reduction-desulfation derivatives include periodic acid oxidation reduction-desulfation heparin (JP-A-11-310602) and the like. Among these, desulfation derivatives and oxidation reduction-desulfation derivatives are preferable, and desulfation derivatives are particularly preferable.

On the other hand, the homoglycan is a polysaccharide comprising a single monosaccharide as the constituting saccharide. Examples in the present invention include glucan (amylose, cellulose, etc.), mannan, glycuronan (pectic acid, alginic acid, etc.), polyglycosamine (chitin, colominic acid, etc.), polygalactosamine and the like; preferred examples include glucan, alginic acid and the like; and more preferred examples include cellulose and alginic acid.

Examples of the derivatives of the homoglycan include carboxymethyl derivatives such as carboxymethylcellulose; hydroxymethyl derivatives such as hydroxymethylcellulose; deacetylation derivatives such as chitosan; and the like. According to the present invention, derivatives having water-solubility are particularly preferable, so that carboxymethyl derivatives and hydroxymethyl derivatives are preferable; carboxymethyl derivatives are more preferable; and carboxymethylcellulose (hereinafter also referred to as "CMC") is most preferable.

Also, each of alginic acid and CMC is acidic homoglycan.

In addition, two or more of the polysaccharides exemplified in the above can be used as a mixture in the present invention.

The polysaccharide to be used in the present invention has a weight average molecular weight of preferably from 1,500 to 500,000, more preferably from 1,500 to 250,000, further preferably from 1,500 to 150,000, and most preferably from 1,500 to 100,000.

Also, the technique for obtaining gel-state photocrosslinked-GAG by irradiating with light a solution prepared by dissolving photoreactive GAG prepared by binding a photoreactive group to GAG having a relatively low molecular weight for crosslinking was previously difficult to carry out because of the difficulty in setting conditions and the like. However, when the production process of the present invention is used, a gel-state photocrosslinked-polysaccharide composition can be obtained markedly easily even when a photoreactive polysaccharide comprising a polysaccharide having a relatively low molecular weight is used.

The polysaccharide to be used in the present invention may be derived from a natural origin or a product chemically synthesized or produced by a microorganism such as yeast by genetic engineering techniques. Regarding GAG, it is possible and preferable in general to prepare it by extracting from a biotic material (cockscomb, umbilical cord, cartilage, skin, small intestine, blood vessel or the like).

The photoreactive group (photoreactive crosslinking group) which constitutes the photocrosslinked-polysaccharide of the present invention is a crosslinking group comprising a photoreactive residue which constitutes the photoreactive polysaccharide. The photoreactive residue may be a residue of any compound which generates a photo-dimerization reaction or a photo-polymerization reaction by ultraviolet ray irradiation, and specific examples include cinnamic acid, substituted cinnamic acid, acrylic acid, acrylic acid derivatives, maleic acid, fumaric acid, sorbic acid, coumarin, thymine and the like. Also, the substituted cinnamic acid includes aminocinnamic acid (preferably p-aminocinnamic acid), which is cinnamic acid in which any one of hydrogen atoms of the benzene ring is substituted with an amino group, and the acrylic acid derivatives include thiopheneacrylic acid, flurylacrylic acid and the like.

Among these photoreactive residues, a substance having a vinylene group which can form a cyclobutane ring by photoreaction is preferable, and from the viewpoint of photo-reactivity and safety, cinnamic acid or substituted cinnamic acid is particularly preferable, and aminocinnamic acid is particularly preferable as the substituted cinnamic acid.

In addition, according to the present invention, a spacer may be contained for keeping a predetermined distance by binding to both of the photoreactive residue and polysaccharide when the photoreactive polysaccharide is formed. Regarding the photoreactive group (photoreactive crosslinking group) to be used in the present invention, the photoreactive residue and a spacer may be bound, and it is preferable that it is bound to the polysaccharide via a spacer. Accordingly, derivatives in which a spacer is bound to cinnamic acid or a substituted cinnamic acid are most preferable as the photoreactive group and are also most preferable as the photoreactive crosslinking group.

According to the present invention, a functional group which generates photo-dimerization reaction or photo-polymerization reaction by photo-reaction of cinnamic acid, substituted cinnamic acid, thymine or the like is defined as "photoreactive residue", and both cases of the photoreactive residue alone and a substituent in which a spacer is bound to the photoreactive residue are defined as "photoreactive group" or "photoreactive crosslinking group".

Specific examples of the most preferable photoreactive crosslinking group as described in the above include cinnamic acid aminoalkyl ester derivatives in which aminoalcohol ($H_2N$—$(CH_2)_n$—OH; n=from 1 to 18, or $H_2N$—$(CH_2$—$O)_m$—$CH_2$—OH; m=from 1 to 9) is bound to the carboxyl group of cinnamic acid via an ester bond, derivatives in which diamine ($H_2N$—$(CH_2)_l$—$NH_2$; l=from 1 to 10) or diol (HO—$(CH_2)_k$—OH; k=from 1 to 10) is introduced into cinnamic acid or substituted cinnamic acid, derivatives in which amino acid (HOOC—$(CHR)_j$—$NH_2$; j=from 1 to 10), a peptide or the like is introduced into substituted cinnamic acid (aminocinnamic acid), and the like. Among these, derivatives in which an amino-alcohol is introduced into the carboxyl group of cinnamic acid (cinnamic acid aminoalkyl ester) are preferable, and regarding the amino-alcohol, n in the above-described formula is preferably from 1 to 18, particularly preferably from 3 to 6, and extremely preferably 3 or 4.

The region where the polysaccharide and photoreactive group are bound in the photoreactive polysaccharide to be used in the production process of the present invention, namely the region where the polysaccharide of the photocrosslinked-polysaccharide and the photoreactive group in the composition of the present invention are bound, can be selected based on the functional groups respectively possessed by the polysaccharide to be used and the photoreactive group (photoreactive crosslinking group) to be used, and are not particularly limited. For example, when GAG, such as hyaluronic acid, chondroitin, chondroitin sulfate, dermatan sulfate, heparin, heparan sulfate or a derivative thereof, is used as the polysaccharide, the binding region includes an amino group (exists as an acetylamino group or a sulfamino group), a hydroxyl group, a carboxyl group and the like, and a carboxyl group is particularly preferable. As an example, when cinnamic acid aminoalkyl ester is used as the photoreactive group (photoreactive crosslinking group), and GAG or a derivative thereof is used as the polysaccharide, the photoreactive group (photoreactive crosslinking group) is bound to the GAG via an amide bond of the amino group of aminoalkyl with the carboxyl group of the GAG or a derivative thereof

The introduction ratio (hereinafter referred to as substitution degree) of the photoreactive group of the photoreactive polysaccharide to be used in the production process of the present invention is from 0.1 to 75%, preferably from 0.3 to 70%, and as described above, the substitution degree of the photoreactive group of the photoreactive polysaccharide according to the composition of the present invention is also from 0.1 to 75%, preferably from 0.3 to 70%. The introduction reaction of the photoreactive group (photoreactive crosslinking group) into polysaccharide can be carried out, for example, in accordance with the method described in JP-A-6-073102 or the like, and the value of this substitution degree can be optionally changed or adjusted by controlling the mol number of the polysaccharide and the mol number of the photoreactive group (photoreactive crosslinking group), to be used in the reaction. Also, the substitution degree can be measured by the method described in Measurement Example 1 which is described later.

Any one of the substances selected from the group consisting of alcohol, a surfactant and a chelating agent according to the present invention (hereinafter also referred to as "additive substance of the present invention") is not particularly limited, so long as it has compatibility with an aqueous solvent.

The alcohol includes the alcohol represented by the following formula (I):

R—OH  (I)

wherein R in the above formula is selected from the group consisting of:
straight chain alkyl having from 1 to 10 carbon atoms,
branched chain alkyl having from 3 to 10 carbon atoms,
—CH$_2$—(CHOH)$_l$—CH$_2$OH (l in the formula is an integer of from 0 to 5), (m in the formula is an integer of from 3 to 5), and
—(CH$_2$CH$_2$O)$_n$—H (n in the formula is an integer of from 3 to 70).

The straight chain alkyl having from 1 to 10 carbon atoms includes methyl, ethyl and the like, and the branched chain alkyl having from 3 to 10 carbon atoms includes isopropyl, t-butyl and the like.

The alcohol includes lower alcohol, polyhydric alcohol or sugar alcohol.

The lower alcohol includes alcohol having from 1 to 10, more preferably from 1 to 8, carbon atoms, and specific examples include methanol, ethanol, isopropyl alcohol, t-butyl alcohol and the like. Examples of the polyhydric alcohol include alcohol in which two or more hydroxyl groups are present in the molecule, more preferably alcohol having three or more hydroxyl groups. Examples include ethylene glycol and glycerol, and ethylene glycol (PEG) is preferable. In addition, it is possible to use either chain sugar alcohol or cyclic sugar alcohol as the sugar alcohol, but chain sugar alcohol is preferable. The sugar alcohol includes inositol, mannitol, xylitol, sorbitol and the like, preferred examples include mannitol, xylitol and sorbitol, and more preferred examples include mannitol and sorbitol.

The surfactant is preferably a nonionic surfactant or an anionic surfactant, the nohionic surfactant is more preferably polyethylene glycol, and the anionic surfactant is more preferably alkyl sulfate, most preferably sodium dodecyl sulfate.

The chelating agent includes hydroxycarboxylic acid such as citric acid, and polyaminocarboxylic acid such as ethylenediaminetetraacetic acid.

In addition, it is preferable that the additive agent of the present invention, particularly the above-described alcohol, has such a property that when the additive agent of the present invention is added to an aqueous solvent solution of the photoreactive polysaccharide and frozen to obtain a frozen product and then the temperature is increased, the frozen product keeps the frozen state at −7° C. or less. In this case, the frozen state means a completely coagulated state. In addition, in order to produce the composition of the present invention having gel property, the additive agent of the present invention is suitably used because of its performance in which the photocrosslinked-product formed when light irradiation is carried out in accordance with the production process of the present invention does not become an insoluble solid matter.

Also, as is described later, it is possible to use the composition of the present invention in medical treatment or medicinal use, and when used for such a purpose, it is necessary to select a substance having at least aqueous solvent compatibility and high biocompatibility as the additive agent of the present invention.

The solvent of the photoreactive polysaccharide-containing solution in the production process of the present invention is an aqueous solvent which can dissolve the photoreactive polysaccharide and is not particularly limited with the proviso that it contains water, and the solution may contain a salt. That is, as water or an aqueous solvent comprising a solution containing water, a solvent capable of dissolving the photoreactive polysaccharide and the additive agent of the present invention can be used. As the aqueous solvent, water, water for injection or physiological saline, or a buffer such as Tris-HCl buffer or phosphate buffered saline can be used.

The concentration of the photoreactive polysaccharide in the photoreactive polysaccharide-containing solution according to the production process of the present invention is, for example, from 0.5 to 10% (w/w), preferably from 0.8 to 8% (w/w), and most preferably from 1 to 6% (w/w). Also, the concentration of the additive agent of the present invention in the photoreactive polysaccharide-containing solution is, for example, from 0.5 to 10% (w/w), more preferably from 0.8 to 9% (w/w), and most preferably from 1 to 8% (w/w).

Also, as a preferred embodiment of the present invention, when considered based on the relationship between the molecular weight of the polysaccharide constituting the photoreactive polysaccharide and the concentration of the photoreactive polysaccharide in the solution, it is preferable that the molecular weight is from 1,500 to 100,000 and the concentration is 0.5 to 10%, it is further preferable that the molecular weight is 1,500 to 100,000 and the concentration is 0.8 to 8%, and it is most preferable that the molecular weight is 1,500 to 100,000 and the concentration is 1 to 6%. Under the conditions as described in the above, it is difficult to obtain a gel-state photocrosslinked-polysaccharide by the conventional photo-crosslinking methods, but a gel-state composition can be easily obtained by the production process of the present invention.

The temperature conditions for carrying out freezing of the photoreactive polysaccharide-containing solution are not particularly limited. The freezing does not require complete coagulation of the solution, and it may be under such temperature conditions that it forms a so-called "sherbet state" in which the solution is partially coagulated to form a solid-liquid mixed phase. Thus, the "freezing" according to the production process of the present invention is a general idea which includes such a solid-liquid mixed phase state. However, the most preferable "temperature conditions for carrying out freezing" are temperature conditions under which the solution is completely coagulated and solidified, and are, for example, 0° C. or less, preferably −5° C. or less, more preferably −7° C. or less, further preferably −15° C. or less, most preferably −20° C. or less.

It is preferable that the irradiation of light is carried out under such conditions that the photoreactive residue efficiently generates photo-dimerization reaction or photo-polymerization reaction. Regarding the kind of light to be irradiated, ultraviolet ray can be preferably exemplified, and as the ultraviolet ray, ultraviolet ray having a wavelength (e.g., from 200 to 600 nm) which does not cut glycoside bonds of the polysaccharide and generates photo-crosslinking reaction on the photoreactive residue is selected. As the ultraviolet lamp, a high pressure mercury lamp or a metal halide lamp is preferable. In addition, it is preferable that unnecessary wavelengths of the ultraviolet rays generated from such a lamp are eliminated, for example, using a cut-off filter or the like. As the cut-off filter, a process filter for exclusive use is preferable, but a commercially available hard glass can also sufficiently cope with the purpose when it can cut off the unnecessary wavelengths.

It is necessary that the quantity of irradiation light is a quantity of light by which the photoreactive polysaccharide can sufficiently generate photo-crosslinking reaction, which is specifically 500 mJ/cm$^2$ or more, preferably 2,500 mJ/cm$^2$ or more, and most preferably 4,000 mJ/cm$^2$ or more, by an ultraviolet ray of 280 nm. Also, when an actinometer is used by attaching a 1/10 extinction filter, the numerical value on the actinometer is displayed by a value of 1/10 of the actual quantity of irradiation light, and the above-described range is the actual quantity of irradiation light.

The composition of the present invention is a photocrosslinked-polysaccharide composition which is obtained by the production process of the present invention, and, as described above, it can be obtained by freezing a solution which contains at least a photoreactive polysaccharide prepared by binding a photoreactive group thereto, an aqueous solvent capable of dissolving the photoreactive polysaccharide and the additive agent of the present invention, irradiating the resulting frozen product with light, and then melting the frozen product.

That is, the composition of the present invention is a photocrosslinked-polysaccharide composition which comprises a photocrosslinked-polysaccharide, an aqueous solvent capable of dissolving the photoreactive polysaccharide and the additive agent of the present invention having aqueous solvent compatibility, and since the composition of the present invention is produced by freezing the aqueous solvent-containing solution, carrying out the photo-crosslinking reaction and then melting the same, it contains water.

The composition of the present invention has high viscoelasticity in comparison with the photoreactive polysaccharide-containing solution and shows a gel property as a hydrogel abundantly containing water or a spongy property excellent in water taking/discharging property, and one showing gel property is preferable. In general, it is difficult to clearly classify properties of substances having viscoelasticity using numerical values such as gel property or spongy property, but physical properties of gel based on the viscoelasticity can be shown by using the dynamic moduli of elasticity such as storage modulus of elasticity (G'), loss modulus of elasticity (G") or loss tangent (tan δ: (G"/G'), and the viscosity.

For example, when the composition of the present invention is used by filling it in an injector such as a syringe for injection, as is described below, the composition of the present invention having gel property is suitable, particularly one having the following moduli of elasticity or viscosity is preferable. When the moduli of elasticity measured by control stress type rheometer (manufactured by Carri-Med, England) are used as the indexes, and when measured by continuously changing from 0.01 to 10 Hz at 37° C., the storage modulus of elasticity (G') is preferably from 0.1 to 800 Pa, the loss modulus of elasticity (G") is preferably from 1 to 180 Pa, and the loss tangent (G"/G') is preferably from 0.1 to 0.8. Also, it is known that when the storage modulus of elasticity is high and the loss modulus of elasticity is low, it becomes a hard gel having the strong elasticity, and in the opposite case, it becomes a gel having strong viscosity. In addition, when the viscosity of 1 ml of the composition of the present invention measured by a rotational viscometer under conditions of standard cone (1 degree) and 20° C. is used as the index, it is preferably from 300 to 30,000 mPa·S, and more preferably from 300 to 20,000 mPa·S.

The photocrosslinked-polysaccharide of the composition of the present invention shows a crosslinking ratio of from 0.5 to 80%, more preferably from 1.5 to 75%, and most preferably from 5 to 70%. Also, the crosslinking ratio is expressed as a ratio (percentage) of 2 times of the number of moles of the dimer to the number of moles of photoreactive crosslinking group introduced into the polysaccharide. For example, when cinnamic acid or substituted cinnamic acid is used as the photoreactive residue and GAG is used as the polysaccharide, the crosslinking ratio can be calculated by the method described in Measurement Example 2.

The concentration of the photocrosslinked-polysaccharide in the composition of the present invention is the same as the concentration of the photoreactive polysaccharide in the above-described photoreactive polysaccharide-containing solution, and is, for example, from 0.5 to 10% (w/w), preferably from 0.8 to 8% (w/w), and most preferably from 1 to 6% (w/w). Also, concentration of the additive agent of the present invention in the composition of the present invention is almost the same as the concentration of the additive agent of the present invention in the photoreactive polysaccharide-containing solution, and is, for example, from 0.5 to 10% (w/w), more preferably from 0.8 to 9% (w/w), and most preferably from 1 to 8% (w/w).

It is possible to use the composition of the present invention, for example, in a medical material for protecting a wound area (a wound covering material), a medical material for keeping a space in the living body (a space keeping material), a medical material for filling a cavity of connective tissue such as bone (a bone filling material), an artificial body fluid (an artificial joint fluid, an artificial tear fluid, an operation assisting material for ophthalmology or the like), a material for keeping moisture on the living body surface or the like (moisture keeping material), an additive agent which is added for keeping the dosage form of a medicament or the like (a filler), a base material to be used as a foothold of cells in cell culture (base material for cell culture) and the like. Particularly, the composition of the present invention having gel property is more suitable to be used in the above-described applications due to its characteristic property of being a fluid state having high viscosity, and it is also possible to use the composition of the present invention which is filled in an injector capable of pushing out the composition, as a kit for injection which is used in the above-described medical applications.

Also, the injector capable of pushing out the composition is an injector which is equipped with a plunger or the like for drug extrusion and can push out the filled drug, and it is possible to use a generally used tool.

The present invention is described below in more detail.

MEASUREMENT EXAMPLE 1

Method for Measuring Substitution Degree of Photoreactive Crosslinking Group:

The ratio of a photoreactive group (photoreactive crosslinking group) introduced into a polysaccharide means a value expressed by a percentage of the number of photoreactive groups introduced per repeating disaccharide unit of the polysaccharide. An amount of the polysaccharide necessary for calculating the substitution degree was measured by a carbazole assay making use of a calibration curve, and an amount of the photoreactive residue in the case of the use of cinnamic acid or amino-cinnamic acid as the photoreactive residue was measured by an absorbance assay (measuring wavelength 269 nm) making use of a calibration curve. However, when the carbazole assay could not be used, this was measured by a dry loss assay making use of a calibration curve.

MEASUREMENT EXAMPLE 2

Method for Measuring Crosslinking Ratio:

Regarding the crosslinking ratio, 1 g of each substance to be tested was saponified for 1 hour with 1 ml of 1 mol/l sodium hydroxide, the thus obtained solution was acidified, and then the substances derived from the photoreactive group (monomer and dimer of the photoreactive residue) were extracted with ethyl acetate and analyzed by high performance liquid chromatography (HPLC) to measure an amount of the dimer making use of a calibration curve. Thereafter, the number of moles of the dimerized photoreactive group per the photoreactive group introduced into the polysaccharide was calculated by a percentage (%).

In the following Examples, "%" means "% by weight" unless otherwise indicated.

EXAMPLE 1

Composition of the Present Invention which Uses Chondroitin Sulfate (1) In 100 ml of distilled water, 1 g of shark cartilage chondroitin sulfate (also to be called CS in this description, trade name: Chondroitin Sulfate C, manufactured by Seikagaku Corporation, weight average molecular weight: 45,000) was dissolved and 50 ml of 1,4-dioxane was added thereto. Subsequently, 182 mg of N-hydroxysuccinimide (hereinafter also referred to as "HOSu"), 152 mg of 1-ethyl-3-(3-dimethylaminopropyl)carbodiimide hydrochloride (hereinafter also referred to as "EDCI·HCl") and 192 mg of aminopropyl cinnamate hydrochloride ($HCl \cdot H_2N(CH_2)_3OCOCH=CH-Ph$: Ph represents a phenyl group) were added thereto in this order to carry out the reaction at room temperature for 2 hours, 1 g of sodium chloride (hereinafter referred also to as "NaCl") was added thereto, and then the mixture was poured into ethanol to obtain a precipitate. The precipitate was washed and recovered and then dried at 40° C. under a reduced pressure to obtain 1 g of photoreactive CS in which $HN(CH)_3OCOCH=CH-PH$ was bound to the carboxyl group of CS. The substitution degree of the photoreactive group into the photoreactive CS, measured in accordance with Measurement Example 1, was 5.3%.

(2) The photoreactive CS obtained in the above-described (1) was dissolved in 5 mmol/l phosphate buffer to give a weight concentration of 3%, and then d-sorbitol was dissolved therein to give a weight concentration of 6% to thereby obtain a reaction solution. The reaction solution was filtered through a 0.22 μm membrane filter (manufactured by Nippon Millipore) and then poured onto a glass plate which had been adjusted to a void of 1 mm, and the reaction solution was frozen under an atmosphere of −20° C. While keeping the frozen state, ultraviolet ray irradiation was carried out at an irradiation light dose of 5000 $mJ/cm^2$ using an 800 W high pressure mercury lamp (manufactured by Oak Seisakusho). After the irradiation, the mixture was melted by returning to room temperature to obtain a gel-state photocrosslinked-CS composition. Its crosslinking ratio was 33% when measured in accordance with Measurement Example 2.

When measurement was carried out by continuously changing from 0.01 to 10 Hz at 37° C. using a control stress type rheometer (manufactured by Carri-Med, England: acrylic parallel plate diameter 4 cm, 0°), the storage modulus of elasticity (G') of 1 ml sample was from 8.1 to 70.5 Pa, and the loss modulus of elasticity (G") was from 5.6 to 29.7 Pa.

On the other hand, as a control, a solution prepared by dissolving the photoreactive CS in 5 mmol/l phosphate buffer to give a weight concentration of 3% was subjected to photo-crosslinking reaction in the same manner as in the above, and then the product was melted by returning to room temperature to obtain photocrosslinked-CS. The photocrosslinked-CS showed a spongy state, so that a gel-state photocrosslinked-CS was not obtained.

EXAMPLE 2

Composition of the Present Invention which Uses Dermatan Sulfate (1) In 100 ml of distilled water, 1 g of cockscomb dermatan sulfate (manufactured by Seikagaku Corporation, weight average molecular weight: 30,000, hereinafter also referred to as "DS") was dissolved, 50 ml of 1,4-dioxane was added thereto, 46 mg of HOSu, 38 mg of EDCI·HCl and 48 mg of aminopropyl cinnamate hydrochloride were added thereto in this order to carry out the reaction at room temperature for 2 hours, and 1 g of sodium chloride was added thereto, and then the mixture was poured into ethanol to obtain a precipitate. The precipitate was washed and recovered and then dried at 40° C. under a reduced pressure to obtain 1 g of photoreactive DS in which $HN(CH)_3OCOCH=CH-PH$ was bound to the carboxyl group. The substitution degree of the photoreactive group into the photoreactive DS was 5.8% when measured in accordance with Measurement Example 1.

(2) The photoreactive DS obtained in the above-described (1) was dissolved in 5 mmol/l phosphate buffer to give a weight concentration of 3%, and then d-sorbitol was dissolved therein to give a weight concentration of 1.5% to thereby obtain a reaction solution. The reaction solution was subjected to photo-crosslinking reaction at an irradiation light dose of 7000 mJ/cm$^2$ in the same manner as in Example 1, and after the irradiation, the mixture was melted by returning to room temperature to obtain a gel-state photocrosslinked-DS composition. Its crosslinking ratio was 36% when measured in accordance with Measurement Example 2.

On the other hand, as a control, a solution prepared by dissolving the photoreactive DS in 5 mM phosphate buffer to give a weight concentration of 3% was subjected to photo-crosslinking reaction in the same manner as in the above, and then the product was melted to obtain a photocrosslinked-DS, but the thus obtained photocrosslinked-DS showed a spongy state, so that gel-state photocrosslinked-DS was not obtained.

EXAMPLE 3

Composition of the Present Invention which Uses a Heparin Derivative (1) In 100 ml of distilled water, 3 g of a derivative of swine small intestine heparin, 6-O-desulfated heparin (a heparin derivative prepared in accordance with the method described in WO00/06608, weight average molecular weight: about 9,000, hereinafter also referred to as "6-O-desulfated Hep") was dissolved, 50 ml of 1,4-dioxane was added thereto, 615.8 mg of HOSu, 513.4 mg of EDCI.HCl and 648.1 mg of aminopropyl cinnamate hydrochloride were added thereto in this order to carry out the reaction at room temperature for 2 hours, and 3 g of NaCl was added thereto, and then the mixture was poured into ethanol to obtain a precipitate. The precipitate was washed and recovered and then dried at 40° C. under a reduced pressure to obtain 2.7 g of photoreactive 6-O-desulfated Hep. The substitution degree of the photoreactive group was 65.5% when measured in accordance with Measurement Example 1.

(2) The photoreactive 6-O-desulfated Hep obtained in the above-described (1) was dissolved in water for injection to give a weight concentration of 4%, and then d-sorbitol was dissolved therein to give a weight concentration of 7% to thereby obtain a reaction solution. The reaction solution was filtered through a 0.22 µm membrane filter (manufactured by Nippon Millipore), poured onto a Pyrex glass plate which had been adjusted to a void of 1 mm, and then frozen under an atmosphere of −20° C. While keeping the frozen state, ultraviolet ray was irradiated at an irradiation light dose of 5000 mJ/cm$^2$ using an 800 W high pressure mercury lamp. After the irradiation, the mixture was melted by returning to room temperature to obtain a gel-state photocrosslinked-6-O-desulfated Hep composition. The crosslinking ratio was 67.6% when measured in accordance with Measurement Example 2. In addition, when the viscosity was measured using a rotational viscometer (manufactured by TOKIMEC) under conditions of standard cone (1 degree) and 20° C., viscosity of 1 ml of the photocrosslinked-6-O-desulfated Hep composition was 9840 mPa·s.

On the other hand, as a control, a solution prepared by dissolving the photoreactive 6-O-desulfated Hep in water for injection to give a weight concentration of 3% was subjected to photo-crosslinking reaction in the same manner as in the above and to the light irradiation, and then the product was melted, but the thus obtained photocrosslinked-6-O-desulfated Hep showed a spongy state, so that a gel-state photocrosslinked-6-O-desulfated Hep was not obtained.

EXAMPLE 4

(1) In 100 ml of distilled water, 3 g of 6-O-desulfated Hep was dissolved, 50 ml of 1,4-dioxane was added thereto, 205.8 mg of HOSu, 171.4 mg of EDCI.HCl and 216.1 mg of aminopropyl cinnamate hydrochloride were added thereto in this order to carry out the reaction at room temperature for 2 hours, and 3 g of NaCl was added thereto, and then the mixture was poured into ethanol to obtain a precipitate. The precipitate was washed and recovered and then dried at 40° C. under a reduced pressure to obtain 2.7 g of photoreactive 6-O-desulfated Hep. The substitution degree of the photoreactive group was 16.0% when measured in accordance with Measurement Example 1.

(2) The photoreactive 6-O-desulfated Hep obtained in the above-described (1) was dissolved in water for injection to give a weight concentration of 4%, and then d-sorbitol was dissolved therein to give a weight concentration of 7%, or poly(ethylene glycol) 400 (hereinafter also referred to as "PEG 400") to give a weight concentration of 4% to thereby obtain a reaction solution. Each of the reaction solutions was subjected to photo-crosslinking reaction in the same manner as in Example 3(2), and then the product was melted by returning to room temperature to obtain a photocrosslinked-6-O-desulfated Hep composition. Both of the reaction solutions resulted in gel-state photocrosslinked-6-O-desulfated Hep compositions. Thereafter, the crosslinking ratio of each photocrosslinked-6-O-desulfated Hep composition was measured in accordance with Measurement Example 2, and the viscosity was measured under conditions of standard cone (1 degree) and 20° C. Also, RE-80L was used for the sample which is obviously liquid, and RE-80U for the gel-state sample. The results are shown in Table 1. On the other hand, regarding the reaction solution to which d-sorbitol was added, the viscosity was measured also on the un-irradiated reaction solution.

TABLE 1

| Added substance | Viscosity of 1 ml photocrosslinked-6-O-desulfated Hep composition (mPa · s) | Crosslinking ratio (%) | Viscosity of 1 ml unirradiated reaction solution (mPa · s) | Property |
| --- | --- | --- | --- | --- |
| d-Sorbitol (7%) | 4210.0 | 45.5 | 298.0 | gel |
| PEG 400 (4%) | 3700.0 | 13.4 | not measured | gel |

On the other hand, as a control, the photoreactive 6-O-desulfated Hep was dissolved in water for injection to give a weight concentration of 3% and subjected to photo-crosslinking reaction in the same manner as in the above. The thus obtained photocrosslinked-6-O-desulfated Hep showed a spongy state, so that a gel-state photocrosslinked-6-O-desulfated Hep was not obtained.

EXAMPLE 5

(1) In 100 ml of distilled water, 1 g of 6-O-desulfated Hep was dissolved, 50 ml of 1,4-dioxane was added thereto, 1371 mg of HOSu, 1142 mg of EDCI.HCl and 1440 mg of aminopropyl cinnamate hydrochloride were added thereto in this order to carry out the reaction at room temperature for 3 hours, and 1 g of NaCl was added thereto, and then the mixture was poured into ethanol to obtain a precipitate. The precipitate was washed and recovered and then dried at 40° C. under a reduced pressure to obtain 1.1 g of photoreactive 6-O-desulfated Hep. The substitution degree was 16.5% when measured in accordance with Measurement Example 1.

(2) The photoreactive 6-O-desulfated Hep obtained in the above-described (1) was dissolved in water for injection to give a weight concentration of 4%, and then PEG 400 was dissolved therein to give a weight concentration of 4%, and PEG 4000 to give a weight concentration of 2%, sodium lauryl sulfate (SDS) to give a weight concentration of 4%, ethylenediaminetetraacetic acid (EDTA) to give a weight concentration of 4%, or citric acid to give a weight concentration of 4% or 2% to thereby obtain a reaction solution. Each of the 6 reaction solutions was subjected to photo-crosslinking reaction in the same manner as in Example 3(2) to obtain a photocrosslinked-6-O-desulfated Hep composition. Thereafter, the viscosity of each of the thus obtained photocrosslinked-6-O-desulfated Hep compositions was measured using a rotational viscometer under conditions of standard cone (1 degree) and 20° C. The results are shown in Table 2.

Also, the viscosity of a solution prepared by dissolving the photoreactive CS obtained in the above in water for injection to give a weight concentration of 4% measured in the same manner as in the above was 76.8 mPa·s.

TABLE 2

| Added substance | Viscosity (mPa · s) | Property |
| --- | --- | --- |
| PEG 400 (4%) | 192.0 | viscous solution |
| PEG 4000 (2%) | 819.2 | gel-state |
| SDS (4%) | 1888.0 | gel-state |
| EDTA (4%) | 6822.0 | sponge-state |
| Citric acid (2%) | 7021.0 | sponge-state |
| Citric acid (4%) | 409.6 | gel-state |
| Control solution | 76.8 | solution |

EXAMPLE 6

(1) In 150 ml of distilled water, 5 g of shark cartilage CS (lot number: N-251, manufactured by Seikagaku Corporation, weight average molecular weight: about 30,000) was dissolved, 75 ml of 1,4-dioxane was added thereto, 13.7 g of HOSu, 11.4 g of EDCI.HCl and 14.4 g of aminopropyl cinnamate hydrochloride were added thereto in this order to carry out the reaction at room temperature for 3 hours, and 4 g of NaCl was added thereto, and then the mixture was poured into ethanol to obtain a precipitate. The precipitate was washed and recovered and then dried at 40° C. under a reduced pressure to obtain 4 g of photoreactive CS. The substitution degree of the photoreactive group was 32.4% when measured in accordance with Measurement Example 1.

(2) The photoreactive CS obtained in the above-described (1) was dissolved in water for injection to give a weight concentration of 4%, PEG 400, PEG 4000 or citric acid was added thereto to give a weight concentration of 2% or 4%, or SDS or EDTA was added thereto to give a weight concentration of 4%, and then d-sorbitol was added thereto to give a weight concentration of 8% to thereby obtain a reaction solution. Each of these 9 reaction solutions was subjected to photo-crosslinking reaction in the same manner as in Example 3(2) to obtain a photocrosslinked-CS composition. Thereafter, the crosslinking ratio was measured in accordance with Measurement Example 2, and the viscosity was measured using a rotational viscometer under conditions of standard cone (1 degree) and 20° C. The viscosity was measured also on the reaction solutions before the crosslinking reaction. The results are shown in Table 3.

On the other hand, as a control, the photoreactive CS was dissolved in water for injection to give a weight concentration of 4% and subjected to photo-crosslinking reaction in the same manner as in the above. The thus obtained photocrosslinked-CS showed a spongy state, so that gel-state photocrosslinked-CS was not obtained.

TABLE 3

| | Viscosity of photocrosslinked-CS composition (mPa · s) | Crosslinking ratio of photocrosslinked-CS composition (%) | Viscosity of unirradiated reaction solution (mPa · s) | Property |
| --- | --- | --- | --- | --- |
| PEG 400 (2%) | 3840.0 | 13.27 | 39.0 | gel |
| PEG 400 (4%) | 222.6 | 11.08 | 27.6 | gel |
| PEG 4000 (2%) | 7117.0 | 16.02 | 37.2 | gel |
| PEG 4000 (4%) | 99.6 | 7.47 | 31.8 | gel |
| Citric acid (2%) | 16540.0 | 25.55 | 34.8 | gel |
| Citric acid (4%) | 7117.0 | 22.29 | 28.8 | gel |
| SDS (4%) | 27290.0 | 17.57 | 39.0 | sponge |
| EDTA (4%) | 19660.0 | 37.03 | 28.8 | gel |
| d-Sorbitol (8%) | 28980.0 | 29.85 | 33.0 | gel |
| Control | 38140.0 | 32.90 | not measured | sponge |

Figure 1:
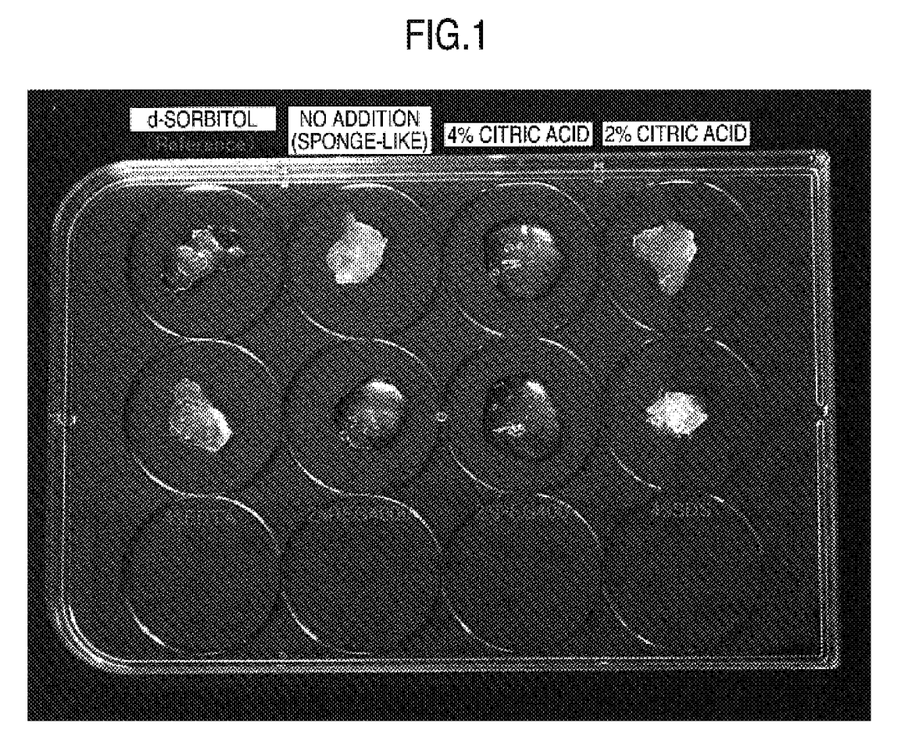
FIG. 1 is a photograph showing properties of photo-crosslinked-CS compositions obtained by adding each of PEG 400 (2%), PEG 4000 (2%), citric acid (2%), citric acid (4%), SDS (4%), EDTA (4%) and d-sorbitol (8%), and a control photocrosslinked-CS.

Appearances of the photocrosslinked-CS compositions obtained by adding each of PEG 400 (2%), PEG 4000 (2%), citric acid (2%), citric acid (4%), SDS (4%), EDTA (4%) and d-sorbitol (8%), and the control photocrosslinked-CS composition are shown in FIG. 1 (photograph).

Figure 2:
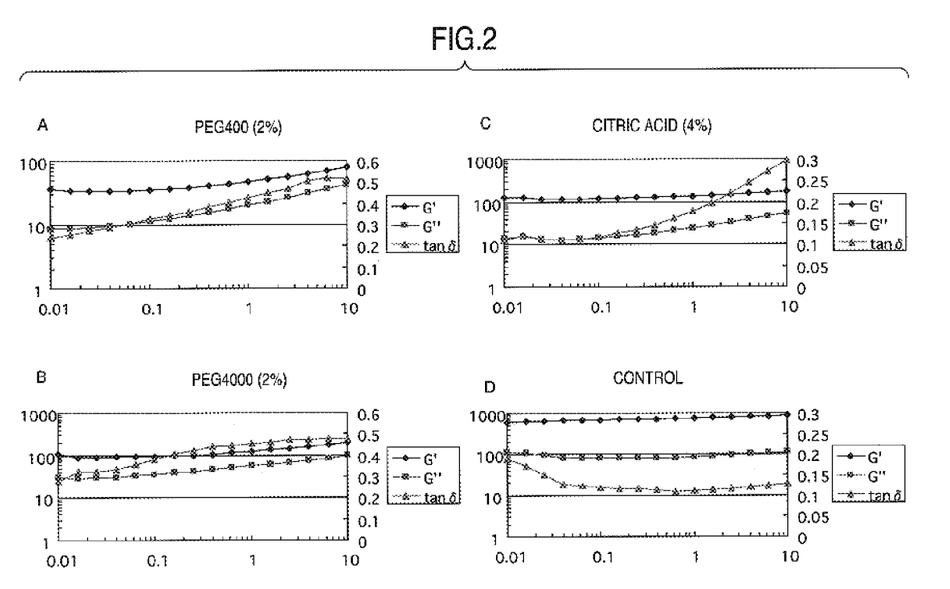
FIG. 2 is a result of oscillation tests for the photo-crosslinked-polysaccharide compositions obtained by adding each of PEG 400 (2%), PEG 4000 (2%) and citric acid and for a control, carried out in Example 6. In the drawing, diamonds indicate the storage modulus of elasticity (G') of 1 ml sample, squares indicate the loss modulus of elasticity (G") of 1 ml sample, and triangles indicate the loss tangent (tan δ: (G"/G')). The scale of the left side vertical line shows the stress (Pa; Pascal), and the scale of right side vertical line shows the loss tangent. The scale of horizontal line shows the frequency (Hz; Hertz).

In addition, an oscillation test was carried out on the photocrosslinked-polysaccharide compositions obtained by adding each of PEG 400 (2%), PEG 4000 (2%) and citric acid (4%), and on the control. That is, using a control stress regulation type rheometer (RA 2000, manufactured by TA Instrument), the measurement was carried out at 37° C. by continuously changing from 10 Hz to 0.01 Hz to measure the storage modulus of elasticity (G') and the loss modulus of elasticity (G") of 1 ml samples, and the tan δ (G"/G') generally used as the index of viscoelasticity was calculated (FIG. 2).

As a result of the oscillation test, the storage modulus of elasticity (G') was larger than the loss modulus of elasticity (G") (G'>G") in each case, that is, it shows that the substances obtained in this example are substances which have high elasticity (G') and low viscosity (G").

EXAMPLE 7

(1) In 150 ml of distilled water, 5 g of swine small intestine heparin (manufactured by SPF, USA, weight average molecular weight: about 9,000, hereinafter also referred to as "Hep") was dissolved, 75 ml of 1,4-dioxane was added thereto, 615 mg of HOSu, 513.4 mg of EDCI.HCl and 648.1 mg of aminopropyl cinnamate hydrochloride were added thereto in this order to carry out the reaction at room temperature for 2 hours, and 3 g of NaCl was added thereto, and then the mixture was poured into ethanol to obtain a precipitate. The precipitate was washed and recovered and then dried at 40° C. under a reduced pressure to obtain 4 g of photoreactive Hep. The substitution degree of the photoreactive group was 47.4% when measured in accordance with Measurement Example 1.

(2) The photoreactive Hep obtained in the above-described (1) was dissolved in water for injection to give a weight concentration of 4%, PEG 400, PEG 4000, citric acid, SDS, EDTA or d-sorbitol was added thereto to give the respective concentration described in Table 4 and dissolved to thereby obtain a reaction solution. Each of these 8 reaction solutions was subjected to photo-crosslinking reaction in the same manner as in Example 6 to obtain a photocrosslinked-Hep composition, and the crosslinking ratio and viscosity were measured. The viscosity was measured also on the un-irradiated reaction solutions before the crosslinking reaction. The results are shown in Table 4.

On the other hand, as a control, the photoreactive Hep was dissolved in water for injection to give a weight concentration of 4% and subjected to photo-crosslinking reaction in the same manner as in the above. The thus obtained photocrosslinked-Hep showed a spongy state, so that gel-state photocrosslinked-Hep was not obtained.

TABLE 4

|  | Viscosity of photocrosslinked-Hep composition (mPa · s) | Crosslinking ratio of photocrosslinked-Hep composition (%) | Viscosity of unirradiated reaction solution (mPa · s) | Property |
| --- | --- | --- | --- | --- |
| PEG 400 (2%) | 153.6 | 18.84 | 10.8 | gel |
| PEG 400 (4%) | 37.2 | 12.89 | 14.4 | gel |
| PEG 4000 (2%) | 1587.0 | 20.08 | 32.4 | gel |
| PEG 4000 (4%) | 43.8 | 8.78 | 24.6 | gel |
| Citric acid (2%) | 922.0 | 20.58 | 14.4 | gel |
| Citric acid (4%) | 33.0 | 15.42 | 16.2 | gel |
| SDS (4%) | 6451.0 | 24.56 | 11.4 | gel |
| EDTA (4%) | 1946.0 | 28.53 | 14.4 | gel |
| d-Sorbitol (8%) | 39.6 | 20.61 | 16.2 | gel |
| Control | 10650.0 | 31.17 | Not measured | sponge |

Figure 3:
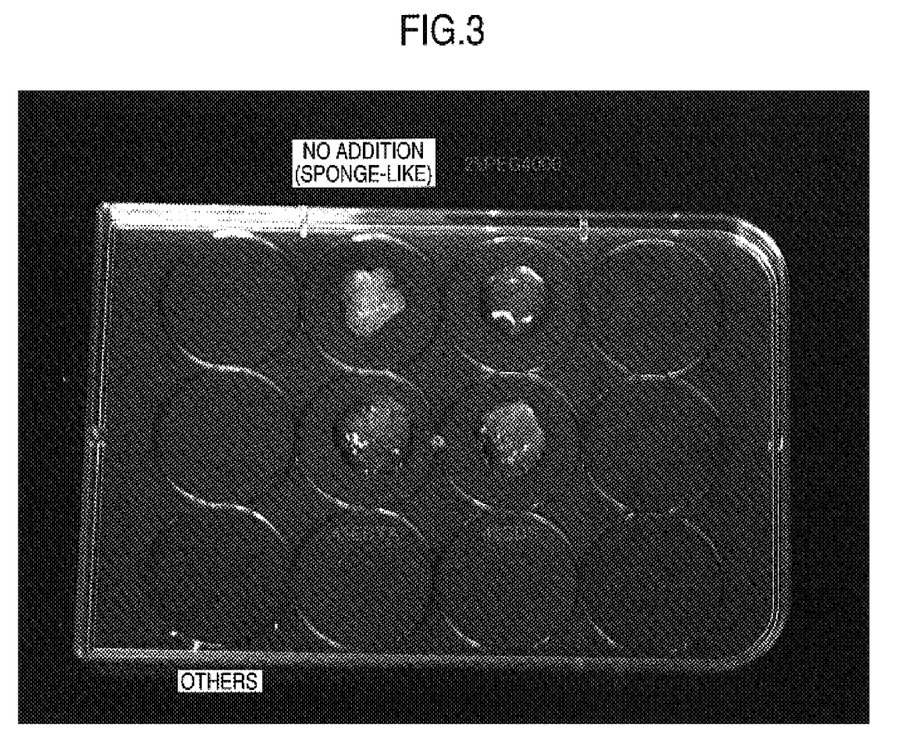
FIG. 3 is a photograph showing properties of photo-crosslinked-CS compositions obtained by adding each of PEG 4000 (2%), SDS (4%) and EDTA (4%), and a control photocrosslinked-CS.

Appearances of the photocrosslinked-CS compositions obtained by adding each of PEG 4000 (2%), SDS (4%) and EDTA (4%), and the control photocrosslinked-CS composition are shown in FIG. 3 (photograph).

EXAMPLE 8

(1) In 150 ml of distilled water, 1 g of carboxymethylcellulose (manufactured by Nacalai Tesque, hereinafter also referred to as "CMC") was dissolved, 75 ml of 1,4-dioxane was added thereto, 324 mg of HOSu, 285 mg of EDCI.HCl and 350 mg of aminopropyl cinnamate hydrochloride were added thereto in this order to carry out the reaction at room temperature for 3 hours, and 1 g of NaCl was added thereto, and then the mixture was poured into 600 ml of ethanol to obtain a precipitate. The precipitate was washed and recovered and then dried at 40° C. under a reduced pressure to obtain 1 g of photoreactive CMC. The substitution degree of the photoreactive group was 19.5%.

(2) The photoreactive CMC obtained in the above-described (1) was dissolved in water for injection to give a weight concentration of 4%, and then PEG 400 was dissolved therein to give a weight concentration of 4%, or d-sorbitol to give a weight concentration of 8% to thereby obtain a reaction solution. When each of these reaction solutions was subjected to photo-crosslinking reaction in the same manner as in Example 3(2), a gel-state photocrosslinked-CMC composition was obtained in each case.

On the other hand, when the photoreactive CMC was dissolved in water for injection to give a weight concentration of 4% and subjected as a control to the photo-crosslinking reaction in the same manner as in the above, a spongy photocrosslinked-CMC was obtained.

EXAMPLE 9

Each of the two gel-like photocrosslinked-CMC compositions obtained in Example 8 and the spongy photocrosslinked-CMC was filled in a 1 ml capacity syringe in an amount of about 0.3 ml (about 30 mm), and the mixture was used as the substance to be tested. Then, 0.2 ml of Blue Dextran solution was gently added from the upper side to each substance to be tested, and then centrifugation of 4000 rpm×3 minutes was carried out. Also, 1 ml of the 1 ml capacity syringe can be converted to 1 cm, so that one scale is 1 mm. The permeation ratio is expressed by the scale width from the contacting surface with the Blue Dextran solution. As a result, Blue Dextran was permeated into 25 mm in the case of the spongy photocrosslinked-CMC, but permeation of Blue Dextran was inhibited in the case of the gel-state photocrosslinked-CMC composition, which was 15 mm in the case of the photocrosslinked-CMC composition obtained by adding PEG 400 (4%), or 4 mm in the case of the photocrosslinked-CMC composition obtained by adding d-sorbitol (8%).

In addition, each of the gel-state photocrosslinked-CMC compositions obtained in Example 6 by adding each of d-sorbitol (8%) and PEG 4000 (2%), and the spongy photocrosslinked-CMC used as the control was filled in a 1 ml capacity syringe in an amount of about 0.4 ml. Using the mixture as the substance to be tested, the permeation ratio of the Blue Dextran solution was measured in the same manner as in the above. As a result, it was 5 mm from the contacting surface with the Blue Dextran solution in the case of the photocrosslinked-CMC composition obtained by adding d-sorbitol (8%), or 4 mm in the case of the photocrosslinked-CMC composition obtained by adding PEG 4000 (2%), so that permeation of Blue Dextran was inhibited in each case. However, the value was 17 mm in the case of the spongy photocrosslinked-CMC, showing high permeability of Blue Dextran.

While the invention has been describe in detail and with reference to specific embodiments thereof, it will be apparent to one skilled in the art that various changes and modifications can be made therein without departing from the spirit and scope of the present invention.

This application is based on a Japanese patent application filed on Mar. 11, 2003 (Japanese Patent Application No. 2003-065704), the contents thereof being thereby incorporated by reference. All of the references cited therein are incorporated as a whole.

INDUSTRIAL APPLICABILITY

A novel photocrosslinked-polysaccharide composition and process for producing the same are provided by the present invention. According to the production process, a photoreactive polysaccharide can be efficiently photocrosslinked. In addition, according to the production process, a gel-state photocrosslinked-polysaccharide composition capable of being injected by an injector can also be obtained easily, so that it can be used in medical applications and the like by using the specific properties of the gel, and is useful.

The invention claimed is:

1. A process for producing a photocrosslinked-polysaccharide composition, which comprises:
   freezing a photoreactive polysaccharide-containing solution comprising a photoreactive polysaccharide in which a photoreactive group is bound to a polysaccharide, an aqueous solvent capable of dissolving the photoreactive polysaccharide, and at least one substance selected from the group consisting of an alcohol, a surfactant and a chelating agent having compatibility with the aqueous solvent; and
   irradiating the resulting frozen product with light,
   wherein the alcohol is represented by the following formula (I):

R—OH (I)

wherein R in the formula (I) is selected from the group consisting of:
   straight chain alkyl having from 1 to 10 carbon atoms;
   branched chain alkyl having from 3 to 10 carbon atoms;
   —CH$_2$—(CHOH)$_l$—CH$_2$OH (1 in the formula is an integer of from 0 to 5);

(m in the formula is an integer of from 3 to 5); and
   —(CH$_2$CH$_2$O)$_n$—H (n in the formula is an integer of from 3 to 70),
   wherein the surfactant is selected from the group consisting of poly(ethylene glycol) and alkyl sulfate, and
   wherein the chelating agent is selected from the group consisting of hydroxycarboxylic acid and polyaminocarboxylic acid.

2. The process according to claim 1, wherein the alcohol has such a property that it keeps a frozen state at −7° C. or less when the alcohol is added to an aqueous solvent solution of the photoreactive polysaccharide and is frozen to obtain the frozen product and then the temperature is increased.

3. The process according to claim 1, wherein the hydroxycarboxylic acid is citric acid, and the polyaminocarboxylic acid is ethylenediaminetetraacetic acid.

4. The process according to claim 1, wherein the polysaccharide constituting the photoreactive polysaccharide is selected from the group consisting of heteroglycan, homoglycan and derivatives thereof.

5. The process according to claim 4, wherein the heteroglycan is glycosaminoglycan selected from the group consisting of hyaluronic acid, chondroitin, chondroitin sulfate, dermatan sulfate, heparin, heparan sulfate and keratan sulfate, and the homoglycan is acidic homoglycan selected from the group consisting of alginic acid and carboxymethylcellulose.

6. The process according to claim 4, wherein the heteroglycan derivative is a glycosaminoglycan derivative, which has been inserted therein.

7. The process according to claim 6, wherein the desulfation derivative is 6-O-desulfated heparin in which a sulfate group bound to the 6-position hydroxyl group of the N-acetylglucosamine residue of heparin is removed.

8. The process according to claim 1, wherein the polysaccharide has a weight average molecular weight of from 1,500 to 500,000.

9. The process according to claim 1, wherein the photoreactive group in the photoreactive polysaccharide binds to a carboxyl group of the polysaccharide.

10. The process according to claim 1, wherein the photoreactive polysaccharide-containing solution is a solution containing from 0.5 to 10% of the photoreactive polysaccharide.

11. The process according to claim 10, wherein the photoreactive polysaccharide is a glycosaminoglycan having a molecular weight of from 1,500 to 100,000.

* * * * *